United States Patent
Tazzia et al.

(10) Patent No.: US 6,214,470 B1
(45) Date of Patent: Apr. 10, 2001

(54) CATHODIC ELECTROCOAT COMPOSITION

(75) Inventors: Charles L. Tazzia, Detroit; Timothy S. December, Rochester; Thirumurti Narayan, Gosse lle, all of MI (US)

(73) Assignee: BASF Corporation, Southfield, MI (US)

( * ) Notice: Subject to any disclaimer, the term of this patent is extended or adjusted under 35 U.S.C. 154(b) by 0 days.

(21) Appl. No.: 09/217,919

(22) Filed: Dec. 21, 1998

(51) Int. Cl.[7] .............................. C25D 13/04; B23B 27/00
(52) U.S. Cl. .................. 428/425.8; 204/501; 204/505; 524/901
(58) Field of Search ................................. 204/501, 505; 524/901

(56) References Cited

U.S. PATENT DOCUMENTS

| | | | |
|---|---|---|---|
| 4,177,342 | * 12/1979 | Bock et al. | 528/45 |
| 4,373,072 | * 2/1983 | Patzschke et al. | 525/438 |
| 4,595,445 | * 6/1986 | Hombach et al. | 156/307.3 |
| 4,738,991 | 4/1988 | Narayan | 521/124 |
| 4,847,346 | * 7/1989 | Vorwerk et al. | 528/45 |
| 4,925,885 | * 5/1990 | Rosthauser et al. | 523/415 |
| 4,968,399 | * 11/1990 | Tsuchiya et al. | 204/181.1 |
| 4,976,837 | * 12/1990 | Hughes et al. | 204/181.7 |
| 5,135,970 | * 8/1982 | Honel et al. | 523/414 |
| 5,319,054 | 7/1994 | Slack et al. | 528/48 |
| 5,380,792 | 1/1995 | Renk | 524/840 |
| 5,440,003 | 8/1995 | Slack | 528/48 |
| 5,440,993 | 8/1995 | Slack | 528/48 |
| 5,466,771 | 11/1995 | Hicks et al. | 528/64 |
| 5,475,122 | * 12/1995 | Hoenel et al. | 556/89 |
| 5,506,327 | * 4/1996 | Yonek et al. | 528/45 |
| 5,574,122 | 11/1996 | Yeske et al. | 528/28 |
| 5,576,411 | 11/1996 | Yeske et al | 528/70 |
| 5,610,260 | 3/1997 | Schmalstieg et al. | 528/49 |
| 5,648,445 | 7/1997 | Slack et al. | 528/49 |
| 5,686,042 | 11/1997 | Slack et al. | 264/328.6 |
| 5,691,439 | 11/1997 | Slack et al. | 528/49 |
| 5,783,652 | 7/1998 | Rosthauser et al. | 528/48 |
| 5,973,097 | * 10/1999 | Dantiki et al. | 528/49 |
| 5,977,247 | * 11/1999 | Schafheutle et al. | 524/591 |

FOREIGN PATENT DOCUMENTS

| | | |
|---|---|---|
| 2203229 | 4/1997 | (CA) . |
| 0 236 050 | 9/1987 | (EP) . |
| 0 305 794 | 8/1989 | (EP) . |
| 0 362 653 | 11/1990 | (EP) . |
| 0 362 654 | 11/1990 | (EP) . |

OTHER PUBLICATIONS

Copy of the Search Report for IN–5171, PCT/US 99/28077, International Filing Date Nov. 23, 1999, 3 pages.
Patent Abstract of Japan, vol. 14 #137, Mar. 15, 1990 & JP 02 011669 A Shinto Paint Co. Ltd, Jan. 16, 1990.

* cited by examiner

*Primary Examiner*—Kathryn Gorgos
*Assistant Examiner*—Christopher M Keehan
(74) *Attorney, Agent, or Firm*—Anna M. Budde

(57) ABSTRACT

An electrocoat coating composition comprising an electrodepositable resin that has functionality reactive with isocyanate and a curing agent having at least one allophanate groups is described. The invention also provides a method of applying the composition of the invention to a substrate and curing the applied coating.

22 Claims, No Drawings

CATHODIC ELECTROCOAT COMPOSITION

FIELD OF THE INVENTION

The invention concerns thermosetting electrocoat primer compositions that have curing agents based on polyisocyanates.

BACKGROUND OF THE INVENTION

Electrodeposition coating compositions and methods are widely used in industry today. One of the advantages of electrocoat compositions and processes is that the applied coating composition forms a uniform and contiguous layer over a variety of metallic substrates regardless of shape or configuration. This is especially advantageous when the coating is applied as an anticorrosive coating onto a substrate having an irregular surface, such as a motor vehicle body. The even, continuous coating layer over all portions of the metallic substrate provides maximum anticorrosion effectiveness.

Electrocoat baths usually comprise an aqueous dispersion of a principal film-forming resin, such as an acrylic or epoxy resin, having ionic stabilization. For automotive or industrial applications for which hard electrocoat films are desired, the electrocoat compositions are formulated to be curable compositions. This is usually accomplished by including in the bath a crosslinking agent that can react with functional groups on the principal resin under appropriate conditions (such as with the application of heat) and thus cure the coating. During electrodeposition, coating material containing an ionically-charged resin having a relatively low molecular weight is deposited onto a conductive substrate by submerging the substrate in an electrocoat bath having dispersed therein the charged resin and then applying an electrical potential between the substrate and a pole of opposite charge, for example, a stainless steel electrode. The charged coating material migrates to and deposits on the conductive substrate. The coated substrate is then heated to cure the coating.

One curing mechanism utilizes a melamine formaldehyde resin curing agent in the electrodepositable coating composition to react with hydroxyl functional groups on the electrodeposited resin. This curing method provides good cure at relatively low temperatures (perhaps 130° C.), but the crosslink bonds contain undesirable ether linkages and the resulting coatings provide poor overall corrosion resistance as well as poor chip and cyclic corrosion resistance.

In order to address some of the problems with melamine cross-linked electrocoats, many commercial compositions employ polyisocyanate crosslinkers to react with hydroxyl or amine functional groups on the electrodeposited resin. This curing method provides desirable urethane or urea crosslink bonds, but it also entails several disadvantages. In order to prevent premature gelation of the electrodepositable coating compositions, the highly reactive isocyanate groups on the curing agent must be blocked. Blocked polyisocyanates, however, require high temperatures, typically 175° C. or more to unblock and begin the curing reaction. In the past, the isocyanate crosslinkers have been blocked with a compound such as an oxime or alcohol, which unblocks and volatilizes during cure, in order to provide the lowest temperatures for the unblocking and curing reactions. The volatile blocking agents released during cure can cause other deleterious effects on various coating properties, however, and increase organic emissions. There is thus a need for electrodepositable coating compositions that could provide desirable urethane or urea crosslink linkages but that avoid the problems that now accompany compositions having polyisocyanate curing agents blocked with volatilizing agents.

SUMMARY OF THE INVENTION

We have now invented electrocoat coating compositions that have lower emissions upon curing of the coating and that typically cure at lower temperatures than current blocked-isocyanate electrocoat compositions. The compositions of the present invention comprise a curing agent having at least one allophanate group. The electrocoat coating compositions of the invention also have unexpectedly improved throwpower properties.

The present invention further provides a method of coating a conductive substrate. In the method of the invention, a conductive substrate is immersed in an electrodeposition coating composition comprising, in an aqueous medium, an ionic resin and a curing agent having at least one allophanate group. A potential of electric current is applied between the conductive substrate and an electrode of the opposite charge to deposit a coating layer onto the conductive substrate. The deposited coating is cured by reaction between the ionic resin and the curing agent having at least one allophanate group.

DETAILED DESCRIPTION OF THE INVENTION

The electrocoat compositions of the present invention comprise, in an aqueous medium, an ionic principal resin and a curing agent having at least one allophanate group. The allophanate crosslinkers of the invention may be prepared by a method that includes a first step of preparing an allophanate compound that has isocyanate functionality and an optional second step of reacting at least some of the residual isocyanate groups with a blocking agent and/or an isocyanate-reactive extender compound to produce a blocked isocyanate and/or higher functionality crosslinker.

In the first step, the allophanate group or groups of the allophanate compound are formed by reacting an excess of equivalents of organic polyisocyanate with a mono- or polyhydric compound in the presence of a catalyst. The reaction is understood to involve formation of an initial urethane group which then, in the presence of an appropriate catalyst, further reacts to form allophanate. The amount of mono- or polyhydric compound employed should usually not exceed one-half equivalent of mono- or polyhydric compound per equivalent of isocyanate to avoid products having an unusably high viscosity. In general, there should be about 0.01 to about 0.5 equivalents of hydroxyl per equivalent of isocyanate. A more preferred range would be from about 0.1 to about 0.3 equivalents of hydroxyl per equivalent of isocyanate. Although reaction conditions may be varied, typically the reaction may continue for 3 to 10 hours at temperatures of perhaps about 60° C. to about 150° C. Progress of the reaction can be monitored by any of the usual methods, such as titration, infrared spectroscopy, or viscosity measurement. A catalyst deactivator may optionally be added to stop the allophanate formation at a point where the desired isocyanate content or viscosity has been obtained. Addition of a deactivator is also desirable for storage stability of the product with unreacted isocyanate content.

Organic polyisocyanates that may be employed to prepare the allophanate containing compound include aromatic, aliphatic, and cycloaliphatic polyisocyanates and combinations thereof. Representative of useful polyisocyanates are diisocyanates such as m-phenylene diisocyanate, 2,4-toluene diisocyanate, 2,6-toluene diisocyanate, mixtures of 2,4- and 2,6-toluene diisocyanate, hexamethylene diisocyanate, tetramethylene diisocyanate, cyclohexane-1,4-diisocyanate, any of the isomers of hexahydrotoluene diisocyanate, isophorone diisocyanate, any of the isomers of hydrogenated diphenylmethane diisocyanate, naphthalene-1,5-diisocyanate, 1-methoxyphenyl-2,4-diisocyanate, any of the isomers of diphenylmethane diisocyanate, including 2,2'-diphenylmethane diisocyanate, 2,4'-diphenylmethane diisocyanate, and 4,4'-diphenylmethane diisocyanate, isomers of biphenylene diisocyanate including 2,2'-, 2,4'-, and 4,4'-biphenylene diisocyanates, 3,3'-dimethoxy-4,4'-biphenyl diisocyanate and 3,3'-dimethyl-diphenylmethane-4,4'-diisocyanate; triisocyanates such as 4,4',4"-triphenylmethane triisocyanate and toluene 2,4,6-triisocyanate; and the tetraisocyanates such as 4,4'-dimethyldiphenylmethane-2,2',5,5'-tetraisocyanate; and polymeric polyisocyanates such as polymethylene polyphenylene polyisocyanate. Especially useful due to their availability and properties are the various isomers of toluene diisocyanate and diphenylmethane diisocyanate and combinations of those isomers. Modified isocyanates, including isocyanurates, biurets, uretdione, and carbodiimide modifications are also advantageously used to produce the allophanate crosslinker.

The mono- and polyhydric compounds that may be reacted with the polyisocyanate may have an equivalent weight of about 30 to about 1000, can contain up to about 8 hydroxyl groups in the molecule, and can also be alkylene oxide adducts of lower molecular weight alcohols. Monohydric alcohols that may be employed include both aliphatic and aromatic alcohols. Suitable examples include, without limitation, methanol, ethanol, propanol, 2-propanol, n-butanol, 2-chloroethanol, pentanol, n-octanol, 2-ethylhexanol, isooctyl alcohol, nonanol, ethylene glycol monoalkyl ethers, propylene glycol monoalkyl ethers, diethylene glycol monoalkyl ethers and higher molecular weight analogs of polyethylene glycol monoalkyl ethers, dipropylene glycol monoalkyl ethers and higher molecular weight analogs of polypropylene glycol monoalkyl ethers, 3,5,5-trimethylhexanol, isodecyl alcohol, benzyl alcohol, phenol, cyclohexanol, 2,2,2-tricholoroethanol, and the like, alkylene oxide adducts thereof, and combinations of these. The alkylene oxide may be ethylene oxide, propylene oxide, butylene oxide, pentylene oxide, or combinations thereof.

Suitable polyhydric alcohols include both aliphatic and aromatic compounds. Particular examples include, without limitation, ethylene glycol, diethylene glycol, and higher polyethylene glycol analogs like triethylene glycol; propylene glycol, dipropylene glycol, and higher polypropylene glycol analogs like tripropylene glycol; 1,4-butanediol, 1,3-butanediol, 1,6-hexanediol, 1,7-heptanediol, glycerine, 1,1,1-trimethylolpropane, 1,1,1-trimethylolethane, hexane-1,2,6-triol, pentaerythritol, sorbitol, 4,4'-isopropylidene diphenol, (bisphenol A), resorcinol, catechol, hydroquinone, alkylene oxide adducts thereof and combinations of these.

Suitable catalysts for the reaction are any that are known to promote formation of allophanate linkages. These include, without limitation, metal carboxylates, alcoholates, oxides, phenolates and metal chelates. The preferred catalysts are acetylacetonates, including zinc, cobalt, nickel, ferric, and aluminum acetylacetonates, and tin compounds, including dibutyltin dilaurate, dibutyltin oxide, stannous octoate, and dibutyltin diacetate.

The reaction may be continued until all of the isocyanate groups have reacted. In this case, when there is no residual isocyanate functionality after the allophanate reaction, the allophanate compound may be used in the electrocoat coating composition without further modification. In one preferred embodiment, however, the allophanate synthesis is ended while isocyanate functionality still remains. The reaction may be stopped with residual functionality, for example, to control the viscosity of the allophanate-functional product. It is preferred to have a viscosity, measured at 50° C., of 500,000 cps or less, more preferably 100,000 cps or less. In one particularly preferred embodiment, the allophanate reaction is continued until an isocyanate equivalent weight is obtained that is from about 200 to about 1200, more preferably from about 250 to about 1000, and even more preferably from about 250 to about 400.

The reaction may effectively be stopped by reducing the temperature, but it is often preferable to add a catalyst deactivator at the desired point of the reaction. Examples of the catalyst deactivators that may optionally be employed at the end of the reaction to prevent further allophanate formation include, without limitation, aliphatic and aromatic acid chlorides such as acetyl chloride, benzoyl chloride, benzenesulfonyl chloride, oxalyl chloride, adipyl chloride, sebacyl chloride, carbonyl chloride, and combinations of such compounds. Inorganic acid deactivators such as perchloric acid and strong organic acids such as trifluoromethanesulfonic acid and trifluoroacetic acid may also be used. Another group of catalyst deactivators that may be used are chloroformates such as methyl chloroformate, ethyl chloroformate, isopropyl chloroformate, n-butyl chloroformate, sec-butyl chloroformate, and diethylene glycol bis chloroformate.

In a preferred embodiment, the isocyanate-functional allophanate compound may be reacted in a second step to block the residual isocyanate groups and/or to extend the compound through reaction of the residual isocyanate groups. Suitable blocking agent are those compounds that will unblock under the curing conditions to regenerate the isocyanate group for reaction as a crosslinking site. Blocking agents suitable for crosslinkers for electrocoat coating compositions are known in the art and include, without limitation, oximes, lower alcohols, lactams, and phenol. Specific examples of such materials include, without limitation, ethylene glycol monobutyl ether, diethylene glycol monobutyl ether, methyl ethyl ketoxime, ε-caprolactam, and phenol.

Alternatively or in addition to reaction with a blocking agent, the isocyanate-functional allophanate precursor compound may be reacted with an extender compound, which is an isocyanate reactive material that is not expected to unblock and regenerate the isocyanate functionality during the curing reactions. Preferably, the extender compound is a polyfunctional compound that has two or more functional groups selected from primary amine groups, secondary amine groups, and alcohol groups. The polyfunctional extender compounds act as extenders to link two or more molecules of the allophanate precursor, producing a crosslinker with more allophanate groups per molecule. Useful examples of extender compounds include aminoalcohols, polyfunctional amines, and polyols. Particular examples of such materials include, without limitation, trimethylolpropane, diethyl toluene diamine, trifunctional or difunctional polyoxyalkylene amines (available commercially under the tradename POLYAMINE® from BASF Corporation or under the tradename JEFFAMINE® from Huntsman). The crosslinker preferably has no residual isocyanate functionality.

The allophanate compound used as the curing agent of the invention has at least about one allophanate group per molecule on average and preferably has a plurality of allophanate groups per molecule. The curing agent preferably has up to about 16, more preferably up to about 12, and even more preferably up to about 8 allophanate groups per molecule on average. The curing agent also has preferably more than about 1, more preferably at least about 2, and even more preferably at least about 3 allophanate groups per molecule, on average. The allophanate compound curing agent of the invention preferably has from about 1 to about 16 allophanate groups on average per molecule, more preferably has from about 1 to about 12 allophanate groups on average per molecule, and even more preferably has from about 1 to about 8 allophanate groups on average per molecule. Typically, the crosslinker may have an equivalent weight of from about 200 to about 1200, based on combined equivalents of allophanate and blocked isocyanate groups (if present). The weight average molecular weight may vary widely. In a preferred embodiment, the crosslinker of the invention has a weight average molecular weight of from about 2000 to about 15,000.

The electrocoat composition is an aqueous dispersion that includes at least a principal film-forming resin and the allophanate curing agent of the invention. A variety of such resins are known, including without limitation, acrylic, polyester, epoxy, and polybutadiene resins Preferably, the principal resin is cathodic, i.e., it has basic groups and is salted with an acid. In a cathodic electrocoating process, the article to be coated is the cathode. Water-dispersible resins used in the cathodic electrodeposition coating process have a cationic functional group such as primary, secondary, and/or tertiary amine moiety as a positively chargeable hydrophilic group.

In a preferred embodiment, the resin is an epoxy resin functionalized with amine groups. Preferably, the epoxy resin is prepared from a polyglycidyl ether. Preferably, the polyglycidyl ether of is the polyglycidyl ether of bisphenol A or similar polyphenols. It may also be advantageous to extend the epoxy resin by reacting an excess of epoxide group equivalents with a modifying material, such as a polyol, a polyamine or a polycarboxylic acid, in order to improve the film properties. Preferably, the polyglycidyl ether is extended with bisphenol A. Useful epoxy resins of this kind have a weight average molecular weight, which can be determined by GPC, of from about 3000 to about 6000. Epoxy equivalent weights can range from about 200 to about 2500, and are preferably from about 500 to about 1500.

Amino groups can be incorporated by reacting the polyglycidyl ethers of the polyphenols with amine or polyamines. Typical amines and polyamines include, without limitation, dibutylamine, ethylenediamine, diethylenetriamine, triethylenetetramine, dimethylaminopropylamine, dimethylaminobutylamine, diethylaminopropylamine, diethylaminobutylamine, dipropylamine, and similar compounds, and combinations thereof. In a preferred embodiment, the epoxide groups on the epoxy resin are reacted with a compound comprising a secondary amine group and at least one latent primary amine. The latent primary amine group is preferably a ketimine group. After reaction with the epoxy the primary amines are regenerated, resulting in an amine-capped epoxy resin. Resins used according to the invention preferably have a primary amine equivalent weight of about 300 to about 3000, and more preferably of about 850 to about 1300.

Epoxy-modified novolacs can be used as the resin in the present invention. The epoxy-novolac resin can be capped in the same way as previously described for the epoxy resin.

Acrylic polymers may be made cathodic by incorporation of amino-containing monomers, such as acrylamide, methacrylamide, dimethyl amino ethyl methacrylate or t-butyl amino ethyl methacrylate. Alternatively, epoxy groups may be incorporated by including an epoxy-functional monomer in the polymerization reaction. Such epoxy-functional acrylic polymers may be made cathodic by reaction of the epoxy groups with polyamines according to the methods previously described for the epoxy resins. The molecular weight of a typical acrylic resin is usually in the range from about 2000 to about 50,000, and preferably from about 3000 to about 15,000.

Cationic polyurethanes and polyesters may also be used. Such materials may be prepared by endcapping with, for example, an aminoalcohol or, in the case of the polyurethane, the same compound comprising a saltable amine group previously described may also be useful.

Polybutadiene, polyisoprene, or other epoxy-modified rubber-based polymers can be used as the resin in the present invention. The epoxy-rubber can be capped with a compound comprising a saltable amine group.

In an alternative embodiment, cationic or anionic acrylic resins may be used. In the case of a cationic acrylic resin, the resin is polymerized using N,N'-dimethylaminoethyl methacrylate, tert-butylaminoethyl methacrylate, 2-vinylpyridine, 4-vinylpyridine, vinylpyrrolidine or other such amino monomers. In the case of an anionic acrylic resin, the resin is polymerized using acrylic acid, methacrylic acid, crotonic acid, maleic acid, fumaric acid, crotonic acid, isocrotonic acid, vinylacetic acid, and itaconic acid, anhydrides of these acids, or other suitable acid monomers or anhydride monomers that will generate an acid group for salting. The polymerization also includes a hydroxyl-functional monomer. Useful hydroxyl-functional ethylenically unsaturated monomers include, without limitation, hydroxyethyl methacrylate, hydroxyethyl acrylate, hydroxypropyl acrylate, hydroxypropyl methacrylate, hydroxybutyl acrylate, hydroxybutyl methacrylate, the reaction product of methacrylic acid with styrene oxide, and so on. Preferred hydroxyl monomers are methacrylic or acrylic acid esters in which the hydroxyl-bearing alcohol portion of the compound is a linear or branched hydroxy alkyl moiety having from 1 to about 8 carbon atoms. The monomer bearing the hydroxyl group and the monomer bearing the group for salting (amine for a cationic group or acid or anhydride for anionic group) may be polymerized with one or more other ethylenically unsaturated monomers. Such monomers for copolymerization are known in the art. Illustrative examples include, without limitation, alkyl esters of acrylic or methacrylic acid, e.g., methyl methacrylate, ethyl acrylate, ethyl methacrylate, propyl acrylate, propyl methacrylate, isopropyl acrylate, isopropyl methacrylate, butyl acrylate, butyl methacrylate, isobutyl acrylate, isobutyl methacrylate, t-butyl acrylate, t-butyl methacrylate, amyl acrylate, amyl methacrylate, isoamyl acrylate, isoamyl methacrylate, hexyl acrylate, hexyl methacrylate, 2-ethylhexyl acrylate, decyl acrylate, decyl methacrylate, isodecyl acrylate, isodecyl methacrylate, dodecyl acrylate, dodecyl methacrylate, cyclohexyl acrylate, cyclohexyl methacrylate, substituted cyclohexyl acrylates and methacrylates, 3,5,5-trimethylhexyl acrylate, 3,5,5-trimethylhexyl methacrylate, the corresponding esters of maleic, fumaric, crotonic, isocrotonic, vinylacetic, and itaconic acids, and the like; and vinyl monomers such as styrene, t-butyl styrene, alpha-methyl styrene, vinyl toluene and the like. Other useful polymerizable co-monomers include, for example, alkoxy-ethyl acrylates and methacrylates, acryloxy acrylates and methacrylates, and compounds such as acrylonitrile, methacrylonitrile, acrolein, and methacrolein. Combinations of these are usually employed.

The amino equivalent weight of the cationic resin can range from about 150 to about 5000, and preferably from about 500 to about 2000. The hydroxyl equivalent weight of the resins, if they have hydroxyl groups, is generally between about 150 and about 2000, and preferably about 200 to about 800.

The electrodeposition coating composition may further contain conventional pigments such as titanium dioxide, ferric oxide, carbon black, aluminum silicate, precipitated barium sulfate, aluminum phosphomolybdate, strontium chromate, basic lead silicate or lead chromate. The pigments may be dispersed using a grind resin or, preferably, a pigment dispersant. The pigment-to-resin weight ratio in the electrocoat bath can be important and should be preferably less than 50:100, more preferably less than 40:100, and usually about 10 to 30:100. Higher pigment-to-resin solids weight ratios have been found to adversely affect coalescence and flow. Usually, the pigment is 10–40 percent by weight of the nonvolatile material in the bath. Preferably, the pigment is 15 to 30 percent by weight of the nonvolatile material in the bath. Any of the pigments and fillers generally used in electrocoat primers may be included. Extenders such as clay and anti-corrosion pigments are commonly included.

The above components are uniformly dispersed in an aqueous medium. Usually, the principal resin and the crosslinking agent are blended together before the resins are dispersed in the water. In a preferred embodiment, the amine groups of the cathodic electrocoat resins are salted with an acid, such as phosphoric acid, propionic acid, acetic acid, lactic acid, or citric acid. The salting acid may be blended with the resins, mixed with the water, or both, before the resins are added to the water. The acid is used in an amount sufficient to neutralize enough of the amine groups of the principal resin to impart water-dispersibility to the resin. The cationic resin may be fully neutralized; however, partial neutralization is usually sufficient to impart the required water-dispersibility. By "partial neutralization" we mean that at least one, but less than all, of the basic groups on the resin are neutralized. By saying that the cationic resin is at least partially neutralized, we mean that at least one of the basic groups on the resin is neutralized, and up to all of such groups may be neutralized. The degree of neutralization that is required to afford the requisite water-dispersibility for a particular resin will depend upon its chemical composition, molecular weight, and other such factors and can readily be determined by one of ordinary skill in the art through straightforward experimentation.

Similarly, the acid groups of an anionic resin are salted with an amine such as dimethylethanolamine or triethylamine. Again, the salting agent (in this case, an amine) may be blended with the resins, mixed with the water, or both, before the resins are added to the water. The anionic principal resin is at least partially neutralized, but may be fully neutralized as in the case of the cationic resin. At least enough acid groups are salted with the amine to impart water-dispersibility to the resin.

Besides water, the aqueous medium of an electrocoat composition may also contain a coalescing solvent. Useful coalescing solvents include hydrocarbons, alcohols, esters, ethers and ketones. The preferred coalescing solvents include alcohols, polyols and ketones. Specific coalescing solvents include monobutyl and monohexyl ethers of ethylene glycol, and phenyl ether of propylene glycol, monoalkyl ethers of ethylene glycol such as the monomethyl, monoethyl, monopropyl, and monobutyl ethers of ethylene glycol; dialkyl ethers of ethylene glycol such as ethylene glycol dimethyl ether; or diacetone alcohol. A small amount of a water-immiscible organic solvent such as xylene, toluene, methyl isobutyl ketone or 2-ethylhexanol may be added to the mixture of water and the water-miscible organic solvent. The amount of coalescing solvent is not critical and is generally between about 0 to 15 percent by weight, preferably about 0.5 to 5 percent by weight based on total weight of the resin solids.

The electrodeposition coating compositions used in the invention can contain optional ingredients such as dyes, flow control agents, plasticizers, catalysts, wetting agents, surfactants, UV absorbers, HALS compounds, antioxidants, defoamers and so forth. Examples of surfactants and wetting agents include alkyl imidazolines such as those available from Ciba-Geigy Industrial Chemicals as AMINE C® acetylenic alcohols such as those available from Air Products and Chemicals under the tradename SURFYNOL®. Surfactants and wetting agents, when present, typically amount to up to 2 percent by weight resin solids. Plasticizers are optionally included to promote flow or modify plating properties. Examples are high boiling water immiscible materials such as ethylene or propylene oxide adducts of nonyl phenols or bisphenol A. Plasticizers can be used at levels of up to 15 percent by weight resin solids.

Curing catalysts such as tin catalysts can be used in the coating composition. Typical examples are without limitation, tin and bismuth compounds including dibutyltin dilaurate, dibutyltin oxide, and bismuth octoate. When used, catalysts are typically present in amounts of about 0.05 to 2 percent by weight tin based on weight of total resin solids.

The electrocoat bath generally has an electroconductivity from 800 micromhos to 6000 micromhos. When conductivity is too low, it is difficult to obtain a film of desired thickness and having desired properties. On the other hand, if the composition is too conductive, problems such as the dissolution of substrate or counter electrode in the bath, uneven film thickness, rupturing of the film, or poor resistance of the film to corrosion or water spotting may result.

The coating composition according to the present invention is electrodeposited onto a substrate and then cured to form a coated article. The electrodeposition of the coating preparations according to the invention may be carried out by any of a number of processes known to those skilled in the art. The electrodeposition coating composition may be applied on any conductive substrate, such as steel, copper, aluminum, or other metals or metal alloys, preferably to a dry film thickness of 10 to 35 $\mu$m. The article coated with the composition of the invention may be a metallic automotive part or body. After application, the coated article is removed from the bath and rinsed with deionized water. The coating may be cured under appropriate conditions, for example by baking at from about 275° F. to about 375° F. for between about 15 and about 60 minutes.

Following electrodeposition, the applied coating is usually cured before other coatings, if used, are applied. When the electrocoat layer is used as a primer in automotive applications, one or more additional coating layers, such as a primer-surfacer, color coat, and, optionally, a clearcoat layer, may be applied over the electrocoat layer. The color coat may be a topcoat enamel. In the automotive industry, the color coat is often a basecoat that is overcoated with a clearcoat layer. The primer surfacer and the topcoat enamel or basecoat and clearcoat composite topcoat may be ether waterborne or solventborne. The coatings can be formulated and applied in a number of different ways known in the art. For example, the resin used can be an acrylic, a polyurethane, or a polyester. Typical topcoat formulations are described in U.S. Pat. Nos. 4,791,168, 4,414,357, 4,546,046, 5,373,069, and 5,474,811. The coatings can be cured by any of the known mechanisms and curing agents, such as a melamine or blocked isocyanate.

The invention is further described in the following example. The example is merely illustrative and does not in any way limit the scope of the invention as described and claimed. All parts are parts by weight unless otherwise noted.

EXAMPLE 1
Preparation of Crosslinker Having Allophanate Groups

A reaction vessel equipped with an addition funnel, stirrer, and thermometer was charged with 2757.3 grams of LUPERNATE® MI (an isomeric blend of diphenylmethane diisocyanate available from BASF Corp.) and 2.58 grams of zinc acetylacetonate monohydrate. Stirring was begun, and the reactor content were heated to about 60–63° C. An addition of 1038.5 grams of ethylene glycol monobutyl ether was carried out at a constant rate over a period of one hour. Thereafter, the content of the flask were heated to about 103–106° C. and maintained at that temperature for five hours. Then, 1.53 grams of benzoyl chloride were added and the reaction mixture was allowed to cool to ambient temperature. The allophanate precursor product had a free NCO content of 8.05% by weight and a viscosity of 59,200 cps at 50° C. An FTIR spectrum of the product included absorptions attributable to allophanate linkages.

A clean, suitable reactor was charged with 522 grams of the allophanate precursor and 130.5 grams of anhydrous methyl isobutyl ketone. The solution was heated to 38° C. and then 0.6 grams of dibutyl tin dilaurate was added. A total of 59.0 grams of ethylene glycol monobutyl ether was added dropwise to the reactor over a period of about 20 minutes while maintaining a temperature of 43–56° C. The reaction mixture was held at 65° C. for an hour. The measured isocyanate equivalent weight at that point was 1366. A total of 22.4 grams of trimethylolpropane was added in portions over 15 minutes while maintaining a temperature between 65–75° C. The reaction mixture was held for two hours at 75° C. until the isocyanate functionality was consumed. The reaction product was diluted with 7.4 grams of n-butanol and 120.5 grams of methyl isobutyl ketone. The product had a nonvolatile content of 72%, a viscosity of 2800 cps at 25° C., and a weight average molecular weight (determine by GPC using a styrene standard) of 3065. The theoretical available isocyanate equivalent weight was 545.

EXAMPLE 2
Preparation of Electrocoat Emulsion

In a suitable container, 823.6 grams of an epoxy solution (812 weight per epoxide) is held at a temperature of 115° C. for addition of 622.6 grams of the crosslinker of Example 1. Then, 152.6 grams of a plasticizer mixture (59% nonvolatiles) was then added. At 85° C., 44.1 grams of the diketimine of diethylene triamine, 48.9 grams of methylethanolamine, and 14.0 grams of propylene glycol phenyl ether were added. After 30 minutes, 15 grams of dimethylaminopropylamine were added and the temperature maintained at 100° C. for 30 minutes. The mixture was reduced to 76% nonvolatile by weight with 114.8 grams isobutanol to produce the final resin mixture.

A two-gallon vessel was charged with 940.7 grams of deionized water and 61.5 grams of 88% lactic acid. The acid number was adjusted to 37 mg KOH/gram. An amount of 1841 grams of the final resin mixture was added with good mixing. A total of 1902 additional grams of deionized water were added in portions with good mixing to produce an emulsion with a nonvolatile content of 30% by weight. Organic solvent was stripped from the emulsion and additional deionized water added. The final emulsion had a viscosity of 35 cps, a nonvolatile content of 28% by weight, a pH of 6.0, and a conductivity of 1800 micromhos. The extent of neutralization was 46%.

In a separate container, 2500 grams of the final emulsion, 217.1 grams of a pigment paste (60% by weight nonvolatile, pigment-to-binder =3.5), and 1467 grams of deionized water were mixed together. The electrocoat bath was mixed for 2 hours in an open vessel. The bath had a nonvolatile content of 20% by weight, and pH of 5.4, and a conductivity of 1777 micromhos.

EXAMPLE 3
Production of Cured Electrocoat Coating

Using a DC rectifier, 4"×12" steel panels were coated as the cathode of an electrodeposition cell with the electrocoat bath at 90° F. The panel was coated from 2.2 minutes at a set voltage was 275 volts for a cured filmbuild of 0.63 mil.

The panels were cured at 325° F. or 350° F. to determine the percent weight loss during cure. The cured films were smooth and continuous. The weight loss during cure was compared to that of a commercial product, CATHOGUARD® 310G, available from BASF Corp., having a standard blocked isocyanate crosslinker.

| Cure Temperature | Example 3 | Commercial Control |
| --- | --- | --- |
| 325° F. | 9.24% | 11.57% |
| 350° F. | 11.79% | 13.56% |

The invention has been described in detail with reference to preferred embodiments thereof. It should be understood, however, that variations and modifications can be made within the spirit and scope of the invention and of the following claims.

What is claimed is:

1. An electrocoat coating composition comprising, in an aqueous medium,
    (a) an ionic resin having functionality reactive with isocyanate groups and
    (b) a compound comprising a plurality of allophanate groups.

2. An electrocoat coating composition according to claim 1, wherein the compound (b) is prepared by a process comprising a step of reacting a hydroxyl-functional compound with a polyisocyanate in a ratio of from about 0.01 to about 0.5 equivalents of alcohol per equivalent of isocyanate.

3. An electrocoat coating composition according to claim 2, wherein the ratio of alcohol to isocyanate is from about 0.1 to about 0.3 equivalents of alcohol per equivalent of isocyanate.

4. An electrocoat coating composition according to claim 2, wherein the alcohol is selected from the group consisting of n-butanol, 2-chloroethanol, 2-ethylhexanol, ethylene glycol monoalkyl ethers, propylene glycol monoalkyl ethers, benzyl alcohol, phenol, ethylene glycol polyethylene glycols, propylene glycol, polypropylene glycols, butanediols, trimethylolpropane, pentaerythritol, and alkylene oxide adducts thereof, and combinations thereof.

5. An electrocoat coating composition according to claim 1, wherein the compound (b) is the reaction product of reaction of:
   (b)(1) an isocyanate-functional precursor having a plurality of allophanate groups and
   (b)(2) a compound selected from the group consisting of blocking agents, extender compounds, and combinations thereof.

6. An electrocoat coating composition according to claim 5, wherein the compound (b)(2) comprises a blocking agent.

7. An electrocoat coating composition according to claim 5, wherein the compound (b)(2) is selected from the group consisting of oximes, lactams, phenol, ethylene glycol monobutyl ether, diethylene glycol monobutyl ether, and combinations thereof.

8. An electrocoat coating composition according to claim 5, wherein the compound (b)(2) comprises a compound that has two or more functional groups selected from the group consisting of primary amine groups, secondary amine groups, alcohol groups, and combinations thereof.

9. An electrocoat coating composition according to claim 8, wherein the compound that has two or more functional groups is selected from the group consisting of trimethylolpropane, diethyl toluene, diamine, trifunctional polyoxyalkylene amines, difunctional polyoxyalkylene amines, and combinations thereof.

10. An electrocoat coating composition according to claim 1, wherein the compound (b) comprises an allophanate of a polyisocyanate selected from the group consisting of isomers of diphenyl methane diisocyanate and mixtures thereof.

11. An electrocoat coating according to claim 1, wherein the compound (b) comprises an allophanate of a polyisocyanate selected from the group consisting of isocyanurates, biurets, uretdione-containing compounds, and carbodiimide-containing compounds.

12. An electrocoat coating composition according to claim 1, wherein the compound (b) comprises from about 3 to about 16 allophanate groups on average per molecule.

13. An electrocoat coating composition according to claim 1, wherein the compound (b) has an equivalent weight of from about 200 to about 1200, based on combined equivalents of allophanate and blocked isocyanate groups.

14. An electrocoat coating composition according to claim 1, wherein the compound (a) is an epoxy resin comprising amine groups salted with an acid.

15. An electrocoat coating composition according to claim 1, wherein the compound (a) is an acrylic resin comprising acid groups salted with an amine.

16. A method of coating a conductive substrate, comprising the steps of:
   (a) providing an aqueous electrocoat coating composition comprising an ionic resin having functionality reactive with isocyanate and a compound comprising a plurality of allophanate groups;
   (b) immersing a conductive substrate in said electrocoat coating composition;
   (c) applying a potential of electric current between an electrode and the conductive substrate to deposit a coating layer onto the conductive substrate; and
   (d) curing the deposited coating layer by reacting of the resin having functionality reactive with isocyanate and the compound comprising a plurality of allophanate groups.

17. A method according to claim 16, wherein the ionic resin is a cationic epoxy resin.

18. A method according to claim 16, wherein the compound comprising a plurality of allophanate groups is the reaction product of
   (a) an isocyanate-functional precursor having a plurality of allophanate groups and
   (b) a compound selected from the group consisting of blocking agents, extender compounds, and combinations thereof.

19. A method according to claim 18, wherein the compound comprising a plurality of allophanate groups has an equivalent weight of from about 200 to about 1200, based on combined equivalents of allophanate and blocked isocyanate groups.

20. A method according to claim 18, wherein the compound comprising a plurality of allophanate groups has from about 3 to about 16 allophanate groups.

21. A coated substrate prepared according to the method of claim 16.

22. A method of preparing an electrocoat coating composition, comprising steps of:
   (a) combining a resin having functionality reactive with isocyanate groups and ionizable functionality with a compound comprising a plurality of allophanate groups to form a resin mixture;
   (b) salting the ionizable functionality and emulsifying the resin mixture in water.

* * * * *